(12) United States Patent
Chidambaran et al.

(10) Patent No.: US 7,552,171 B2
(45) Date of Patent: *Jun. 23, 2009

(54) INCREMENTAL RUN-TIME SESSION BALANCING IN A MULTI-NODE SYSTEM

(75) Inventors: Lakshminarayanan Chidambaran, Sunnyvale, CA (US); Debashish Chatterjee, Fremont, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 889 days.

This patent is subject to a terminal disclaimer.

(21) Appl. No.: 10/918,055

(22) Filed: Aug. 12, 2004

(65) Prior Publication Data

US 2005/0055446 A1  Mar. 10, 2005

Related U.S. Application Data

(60) Provisional application No. 60/500,050, filed on Sep. 3, 2003, provisional application No. 60/500,096, filed on Sep. 3, 2003, provisional application No. 60/495,368, filed on Aug. 14, 2003.

(51) Int. Cl.
*G06F 15/16* (2006.01)
*G06F 12/00* (2006.01)

(52) U.S. Cl. .................. 709/203; 718/105
(58) Field of Classification Search ......... 709/203, 709/226–229, 238–250; 718/105
See application file for complete search history.

(56) References Cited

U.S. PATENT DOCUMENTS

| | | | |
|---|---|---|---|
| 5,013,222 A | 5/1991 | Sokol et al. | |
| 5,758,345 A | 5/1998 | Wang | |
| 5,774,668 A | 6/1998 | Choquier et al. | |
| 5,890,167 A | 3/1999 | Bridge, Jr. et al. | |
| 5,918,059 A | 6/1999 | Tavallaei et al. | |
| 5,951,694 A | 9/1999 | Choquier et al. | |
| 6,041,357 A | 3/2000 | Kunzelman et al. | |
| 6,088,728 A | 7/2000 | Bellemore et al. | |
| 6,178,529 B1 | 1/2001 | Short et al. | |

(Continued)

FOREIGN PATENT DOCUMENTS

EP  0 942 363 A2  9/1999

(Continued)

OTHER PUBLICATIONS

"Office Action" received in related case U.S. Appl. No. 10/917,661, filed Aug. 12, 2004, 9 pages.

(Continued)

*Primary Examiner*—Zarni Maung
(74) *Attorney, Agent, or Firm*—Hickman Palermo Truong & Becker LLP; Deborah L. Caswell

(57) ABSTRACT

An approach migrates database sessions from a database server on which performance and resource availability requirements are not being met to another database server. Because workload is removed from the database server not meeting these requirements, improved performance there is promoted. Furthermore, the approach switches the users in a way that attempts to keep performance and resource availability levels at the database server receiving the database sessions within goals for performance and resource availability.

84 Claims, 5 Drawing Sheets

U.S. PATENT DOCUMENTS

| | | | |
|---|---|---|---|
| 6,243,751 | B1 | 6/2001 | Chatterjee et al. |
| 6,272,503 | B1 | 8/2001 | Bridge et al. |
| 6,327,622 | B1 | 12/2001 | Jindal et al. |
| 6,556,659 | B1 | 4/2003 | Bowman-Amuah |
| 6,587,866 | B1 | 7/2003 | Modi et al. |
| 6,601,101 | B1 * | 7/2003 | Lee et al. ............... 709/227 |
| 6,667,751 | B1 | 12/2003 | Wynn et al. |
| 6,728,748 | B1 | 4/2004 | Mangipudi et al. |
| 6,816,907 | B1 | 11/2004 | Mei et al. |
| 7,024,394 | B1 | 4/2006 | Ashour et al. |
| 7,058,957 | B1 | 6/2006 | Nguyen |
| 7,107,294 | B2 | 9/2006 | Romanufa et al. |
| 7,117,242 | B2 * | 10/2006 | Cherkasova et al. ......... 709/203 |
| 7,174,379 | B2 * | 2/2007 | Agarwal et al. ............ 709/226 |
| 7,178,050 | B2 | 2/2007 | Fung et al. |
| 7,263,590 | B1 | 8/2007 | Todd et al. |
| 7,269,157 | B2 * | 9/2007 | Klinker et al. ............. 370/351 |
| 7,277,945 | B1 | 10/2007 | Shah et al. |
| 2001/0056493 | A1 | 12/2001 | Mineo |
| 2002/0073139 | A1 | 6/2002 | Hawkins et al. |
| 2002/0129157 | A1 | 9/2002 | Varsano |
| 2002/0161896 | A1 | 10/2002 | Wen et al. |
| 2002/0188740 | A1 * | 12/2002 | Tang et al. ................ 709/230 |
| 2002/0188753 | A1 * | 12/2002 | Tang et al. ................ 709/237 |
| 2002/0194015 | A1 | 12/2002 | Gordon et al. |
| 2003/0005028 | A1 | 1/2003 | Dritschler et al. |
| 2003/0007497 | A1 | 1/2003 | March et al. |
| 2003/0063122 | A1 | 4/2003 | Cichowlas et al. |
| 2003/0088671 | A1 * | 5/2003 | Klinker et al. ............. 709/225 |
| 2003/0108052 | A1 * | 6/2003 | Inoue et al. ................ 370/399 |
| 2003/0135642 | A1 | 7/2003 | Benedetto et al. |
| 2003/0208523 | A1 | 11/2003 | Gopalan et al. |
| 2003/0217159 | A1 | 11/2003 | Schramm-Apple et al. |
| 2004/0111506 | A1 | 6/2004 | Kundu et al. |
| 2004/0117794 | A1 | 6/2004 | Kundu |
| 2004/0176996 | A1 * | 9/2004 | Powers et al. ............... 705/11 |
| 2004/0268357 | A1 | 12/2004 | Joy et al. |
| 2005/0021771 | A1 | 1/2005 | Kaehn et al. |
| 2005/0165925 | A1 | 7/2005 | Dan et al. |
| 2005/0239476 | A1 | 10/2005 | Betrabet et al. |
| 2005/0267965 | A1 | 12/2005 | Heller |
| 2006/0036617 | A1 | 2/2006 | Bastawala et al. |
| 2007/0226323 | A1 | 9/2007 | Halpern |

FOREIGN PATENT DOCUMENTS

| | | |
|---|---|---|
| EP | 0942363 A2 | 9/1999 |
| EP | 0 992 909 A2 | 4/2000 |
| EP | 1 170 662 A2 | 1/2002 |
| WO | WO 02/05116 A2 | 1/2002 |
| WO | WO 02/07037 A | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014928 A2 | 2/2003 |
| WO | WO 03/062983 A2 | 7/2003 |

OTHER PUBLICATIONS

"Office Action" received in related case U.S. Appl. No. 10/918,056, filed Aug. 12, 2004, 9 pages.

"Office Action" received in related case U.S. Appl. No. 10/917,687, filed Aug. 12, 2004, 9 pages.

"Office Action" received in U.S. Appl. No. 11/057,043 dated Apr. 9, 2008, 19 pages.

Patent Cooperation Treaty, "Notification of Transmittal of the International Preliminary Report on Patentability," PCT/US2004/026405, dated Oct. 10, 2006, 7 pages.

Amended Claims, PCT/US2004/026405, dated Apr. 6, 2006, 4 pages (attached).

International Searching Authority, "Notification of Transmittal of the International Search Report and the Written Opinion of the International Searching Authority, or the Declaration," PCT/US2004/026405, dated Jan. 6, 2006, 13 pages.

Current Claims, PCT/US2004/026405, 7 pages. (Mar. 23, 2006).

European Patent Office, "Communication Pursuant to Article 96(2) EPC," App. No. 04781256.3 (50277-2985), dated Feb. 2, 2007, 4 pages.

Claims, App. No. 04781256.3 (50277-2985), pp. 34-36. (Feb. 10, 2006).

Kokku, Ravi et al., "Half-Pipe Anchoring: An Efficient Technique for Multiple Connection Handoff," Proceedings of the 10th International Conference of Network Protocols, Nov. 12, 2002, 10 pages. (2000).

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages. (2004).

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5. (2004).

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

"Office Action" received in U.S. Appl. No. 11/057,043 dated Apr. 9, 2008, 19 pages.

"Notice of Allowance and Fee Due" received in U.S. Appl. No. 10/917,846 received on Apr. 1, 2008 (7 pages).

Chase, Jeffrey S., "Dynamic Virtual Clusters in a Grid Site Manager," Proceedings of the IEEE International Symposium on HPDC-2003, XP010463715, pp. 90-100 (2003).

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages. (2004).

International Preliminary Examining Authority, "Written Opinion of the International Preliminary Examining Authority," Jun. 7, 2005, 4 pages.

Current Claims of International Application No. PCT/US04/26570, 4 pages. (2004).

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, December 12003, IEEE, CP010677300, pp. 3663-3667. (Dec. 2003).

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages. (2004).

Current Claims of International Application No. PCT/US2004/025805, 8 pages. (2004).

International Searching Authority, "Notification of Transmittal of the International Search Report and the Written Opinion of the International Searching Authority, or the Declaration," dated Dec. 3, 2004, 12 pages.

European Patent Office, "Communication under Rule 71(3) EPC", Application Number 04781286.2-1244, dated Sep. 11, 2008, 6 pages.

Claims, Application No. 04781286.2-1244, dated Sep. 11, 2008, 40 pages.

* cited by examiner

INCREMENTAL RUN-TIME SESSION BALANCING IN A MULTI-NODE SYSTEM

RELATED APPLICATIONS

The present application claims priority to U.S. Provisional Application No. 60/495,368, *Computer Resource Provisioning*, filed on Aug. 14, 2003, which is incorporated herein by reference; the present application claims priority to U.S. Provisional Application No. 60/500,096, *Service Based Workload Management and Measurement in a Distributed System*, filed on Sep. 3, 2003, which is incorporated herein by reference; the present application claims priority to U.S. Provisional Application No. 60/500,050, *Automatic And Dynamic Provisioning Of Databases*, filed on Sep. 3, 2003, which is incorporated herein by reference.

The present application is related to the following U.S. Applications:

U.S. application Ser. No. 10/718,747, *Automatic and Dynamic Provisioning of Databases*, filed on Nov. 21, 2003, which is incorporated herein by reference;

U.S. application Ser. No. 10/917,873, *Hierarchical Management of the Dynamic Allocation of Resources in a Multi-Node System*, filed by Benny Souder, et al. on the equal day herewith, and incorporated herein by reference;

U.S. application Ser. No. 10/917,953, *Transparent Session Migration Across Servers*, filed by Sanjay Kaluskar, et al. on the equal day herewith and incorporated herein by reference;

U.S. application Ser. No. 10/917,661, *Calculation of Service Performance Grades in a Multi-Node Environment That Hosts the Services*, filed by Lakshminarayanan Chidambaran, et al. on the equal day herewith and incorporated herein by reference;

U.S. application Ser. No. 10/918,056, *Service Placement for Enforcing Performance and Availability Levels in a Multi-Node System*, filed by Lakshminarayanan Chidambaran, et al. on the equal day herewith and incorporated herein by reference;

U.S. application Ser. No. 10/917,687, *On Demand Node and Server Instance Allocation and De-Allocation*, filed by Lakshminarayanan Chidambaran, et al. on the equal day herewith and incorporated herein by reference;

U.S. application Ser. No. 10/918,054, *Recoverable Asynchronous Message Driven Processing in a Multi-Node System*, filed by Lakshminarayanan Chidambaran, et al. on the equal day herewith and incorporated herein by reference; and U.S. application Ser. No. 10/917,715, *Managing Workload by Service*, filed by Carol Colrain, et al. on the equal day herewith and incorporated herein by reference.

FIELD OF THE INVENTION

The present invention relates to work load management, and in particular, work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of grid computing is the notion of computing as a utility, analogous to the electric power grid or the telephone network. A client of the grid does not care where its data is or where the computation is performed. All a client wants is to have computation done and have the information delivered to the client when it wants.

This is analogous to the way electric utilities work; a customer does not know where the generator is, or how the electric grid is wired. The customer just asks for electricity and gets it. The goal is to make computing a utility—a ubiquitous commodity. Hence it has the name, the grid.

This view of grid computing as a utility is, of course, a client side view. From the server side, or behind the scenes, the grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase, a database server for another database is removed from one server blade and a database server for the database experiencing increased user requests is provisioned to the server bade.

Grid computing for databases can require allocation and management of resources at different levels. At a level corresponding to a single database, the performance provided to the users of the database must be monitored and resources of the database allocated between the users to ensure performance goals for each of the users are met. Between databases, the allocation of a grid's resources between the databases must be managed to ensure that performance goals for users of all the databases are met. The work to manage allocation of resources at these different levels and the information needed to perform such management is very complex. Therefore, there is a need for a mechanism that simplifies and efficiently handles the management of resources in a grid computer system for database systems as well as other types of systems that allocate resources at different levels within a grid.

One such mechanism is the system described in *Hierarchical Management of the Dynamic Allocation of Resources in a Multi-Node System* (50277-2382), which uses a hierarchy of directors to manage resources at different levels. One type of director, a database director, manages resources allocated to a database among users of the database. For example, a grid may host multiple database servers for a database, each database server hosting a number of database sessions for a user. To switch users from a poorly performing database server to a better performing database server, a database director switches users from database sessions on the poorer performing database server to database sessions on the better performing database server. However, switching database sessions to the latter database server may impact the performance of that database server. It is desirable that database sessions be switched in a way that does not undermine performance and resource availability requirements for other users or database servers, or in a way that minimizes impact on the performance realized by the other users and database servers.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach that may be used to "migrate" database sessions from a database server on which performance and resource availability requirements are not being met to another database server. Because workload is removed from the database server not meeting these requirements, improved performance there is promoted. Furthermore, the approach switches the users in a way that attempts to keep performance and resource availability levels at the database server receiving the database sessions within goals for performance and resource availability.

Figure 1:
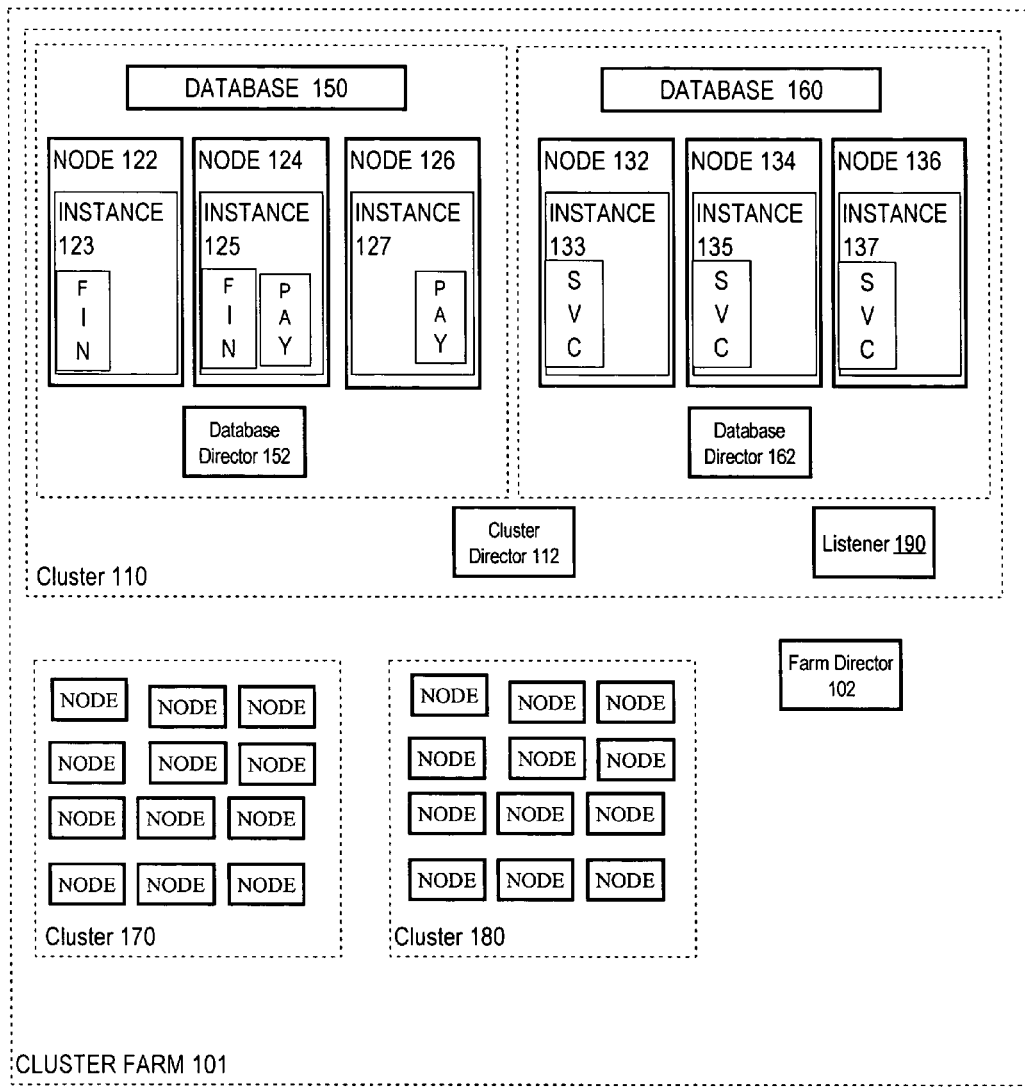
FIG. 1 is a block diagram showing a multi-node computer system on which an embodiment of the present invention may be implemented.

FIG. 1 shows a multi-node computer system that may be used to implement an embodiment of the present invention.

Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster. Cluster farm 101 includes clusters 110, 170, and 180. Each of the clusters hosts one or more multi-node database servers that provide and manage access to databases.

The nodes in a cluster farm may be in the form of computers (e.g. work stations, personal computers) interconnected via a network. Alternately, the nodes may be the nodes of a grid. A grid is composed of nodes in the form of server blades interconnected with other server blades on a rack. Each server blade is an inclusive computer system, with processor, memory, network connections, and associated electronics on a single motherboard. Typically, server blades do not include onboard storage (other than volatile memory), and they share storage units (e.g. shared disks) along with a power supply, cooling system, and cabling within a rack.

Multi-node Servers

Clusters 110, 170, and 180 host one or more multi-node database servers. Cluster 110 hosts a multi-node database server for database 150, the multi-node database server comprising database instances 123, 125, and 127, which are hosted on nodes 122, 124, and 126, respectively. Cluster 110 also hosts a multi-node database server for database 160, the multi-node database server comprising database instances 133, 135, and 137 hosted on nodes 132, 134, and 136, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Database instances 123, 125, and 127 are instances of the same multi-node database server.

Services

As mentioned before, a service is work of a particular type or category that is hosted for the benefit of one or more clients. One type of service is a database service. Cluster 110 provides a database service for accessing database 150 and a database service for accessing database 160. In general, a database service is work that is performed by a database server for a client, work that typically includes processing queries that require access to a particular database.

Like any service, a database service may be further categorized. Database services for database 150 are further categorized into the FIN service and PAY service. The FIN service is the database service performed by database instances 123 and 125 for the FIN application. Typically, this service involves accessing database objects on database 150 that store database data for FIN applications. The PAY services are database services performed by database instances 125 and 127 for the PAY application. Typically, this service involves accessing database objects on database 150 that store database data for PAY applications.

Sessions

In order for a client to interact with a database server on cluster 110, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session is established, and temporary variable values generated by processes executing software within the database session.

A client establishes a database session by transmitting a database connection request to cluster 110. A listener, such as listener 190, receives the database connection request. Listener 190 is a process running on cluster 110 that receives client database connection requests and directs them to a database instance within cluster 110. The client connection requests received are associated with a service. (e.g. service FIN and PAY) The client request is directed to a database instance hosting the service, where a database session is established for the client. Listener 190 directs the request to the particular database instance and/or node in a way that is transparent to the application. Listener 190 may be running on any node within cluster 110. Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

Monitoring Workload

Resources are allocated and re-allocated to meet levels of performance and cardinality constraints on the resources. Levels of performance and resource availability established for a particular service are referred to herein as service-level agreements. Levels of performance and cardinality constraints on resources that apply to a multi-node system in general and not necessarily to a particular service are referred to herein as policies. For example, a service-level agreement for service FIN maybe require as a level of performance that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. These measures of workload are used to determine whether service-level agreements are being met and to adjust the allocation of resources as needed to meet the service-level agreements.

According to an embodiment of the present invention, a workload monitor is hosted on each database instance and generates "performance metrics". Performance metrics is data that indicates the level of performance for one or more resources or services based on performance measures. Approaches for performing these functions are described in *Measuring Workload by Service* (50277-2337). The information generated is accessible by various components within multi-node database server 222 that are responsible for managing for managing the allocation of resources to meet service-level agreements, as shall be described in greater detail later.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

For example, execution time of a transaction is a performance measure. A service-level agreement based on this measure is that a transaction for service FIN should execute within 300 milliseconds. Yet another performance measure is percentage CPU utilization of a node. A backend policy based on this measure is that a node experience no more than 80% utilization.

Performance metrics can indicate the performance of a cluster, the performance of a service running on a cluster, a node in the cluster, or a particular database instance. A performance metric or measure particular to a service is referred to herein as a service performance metric or measure. For example, a service performance measure for service FIN is the transaction time for transactions executed for service FIN.

Figure 2:
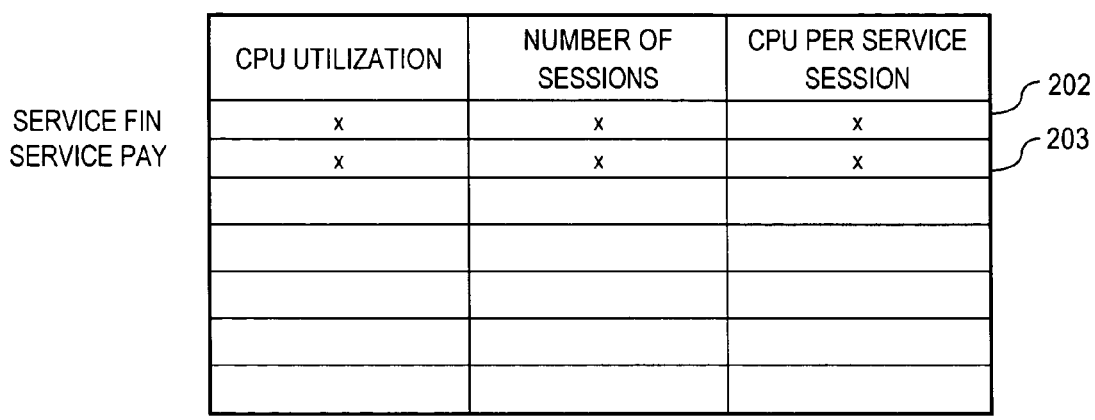
FIG. 2 is a block diagram showing performance metrics according to an embodiment of the present invention.

FIG. 2 is a diagram that shows performance metrics generated by a workload monitor running on database instance 125 according to an embodiment of the present invention. Referring to FIG. 2, performance metrics table 201 reflects the performance realized by services hosted by database instance 125. Performance metrics table 201 contains columns with values that serve as a performance metric for a particular service hosted by database instance 125. Rows 202 and 203 contain performance metrics for service FIN and PAY, respectively. The table includes the columns CPU UTILIZATION, NUMBER OF SESSIONS, and CPU PER SERVICE SESSION. CPU UTILIZATION contains values that specify a percentage of CPU utilization on node 124 used by a service. NUMBER OF SESSIONS contains values that specify a number of database sessions allocated for a service. CPU PER SERVICE SESSION contains values that specify an average percent CPU utilization of a node for the database sessions of a service on a node.

Hierarchy of Directors

A hierarchy of directors, such as that described in *Hierarchical Management of the Dynamic Allocation of Resources in a Multi-Node System* (50277-2382), is used to dynamically adjust the allocation of resources within cluster farm 101 to meet service-level agreements. Cluster farm 101 includes a database director for each database managed by a database server on cluster farm 101, a cluster director for each cluster within cluster farm 101, and a farm director for cluster farm 101.

A database director, such as database director 152 and 162, dynamically manages and adjusts the allocation of resources for a database between services hosted by the database instances of the database. One measure a database director uses to perform this responsibility is to perform runtime session balancing between the database instances of a database. Runtime session balancing shall be described in greater detail.

A cluster director, such as cluster director 112, manages and adjusts allocation of resources between databases. One measure a cluster director undertakes to perform this responsibility is to add or remove a database instance for a database to or from an existing node within a cluster.

A farm director, such as farm director 102, manages and adjusts allocation of resources between clusters. One measure a farm director undertakes to perform this responsibility is to add or remove a node to or from a cluster.

The directors detect violations of service-level agreements, herein referred to as service-level violations. For example, the workload monitor running on database instance 125 periodically analyzes performance metrics and determines that the average transaction time for FIN on instance 125 violates the service-level agreement for this measure or determines that the percent CPU utilization on node 124 for service FIN violates the policy for CPU utilization. Database director 152 may determine that the CPU utilization for instance 125 violates the service-level agreement for this measure.

According to an embodiment, a database director remedies a service-level violation it detects by initially making adjustments to resource allocations that are less disruptive and less costly before resorting to more disruptive and more costly resource allocations. Migrating database sessions of a service between the database instances of a database that are hosting the service is in general less disruptive and less costly than expanding the service to another database instance or adding another database instance for the service to another node. Techniques for performing transparent session migration are described in U.S. application Ser. No. _____, *Transparent Session Migration Across Servers*.

Incremental Run-Time Session Balancing

According to an embodiment of the present invention, run-time session balancing is performed incrementally. Under incremental run-time session balancing (also referred to herein as incremental session balancing), a set of database sessions for a "target service" is migrated from a "source instance" to another database instance ("destination instance") on another node in response to a resource alert. A resource alert is the detection of a condition or event requiring resource allocation management within a multi-node computer system. Resource alerts typically include detection of service-level violations that are responded to by attempting to adjust allocation of resources within the database instances of a database, cluster, or cluster farm. For example, a resource alert is detecting that the average transaction time for service FIN on database instance 125 exceeds a service-level agreement for this measure. In response to detecting this service-level violation, incremental session balancing is performed with instance 125 as the source instance, and FIN or another service hosted by instance 125 as the target service. If the resource alert persists, another set of database sessions is migrated.

The node hosting the source instance is referred to as the source node. The node to which the database sessions are migrated is referred to as the destination node.

Figure 3:
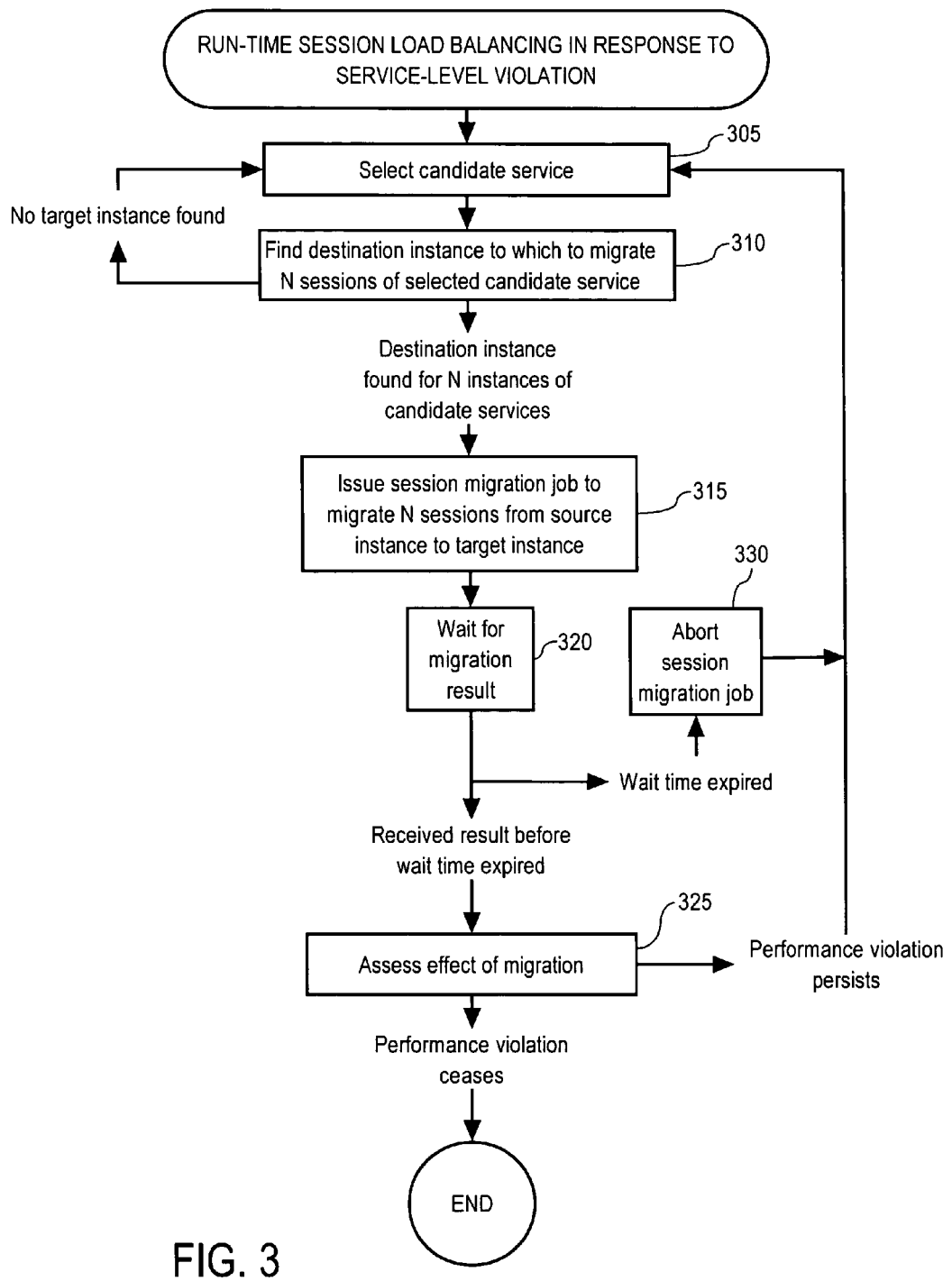
FIG. 3 is a flow chart showing a procedure for incremental run-time session balancing according to an embodiment of the present invention.

FIG. 3 shows a procedure for performing incremental run-time session balancing according to an embodiment of the present invention. The procedure selects a target service for which to migrate database sessions. The target service is selected from among the services hosted by the source instance, referred to herein as the candidate services. Next, the procedure selects a "destination instance" hosting the target service on a "destination node" different than the source node, and then migrates a number of database sessions of the target service from the source instance to the destination instance. Once the migration is performed, the procedure assesses the effect of the session migration, performing one or more iterations of the procedure as long as the service-level violation persists.

Figure 4:
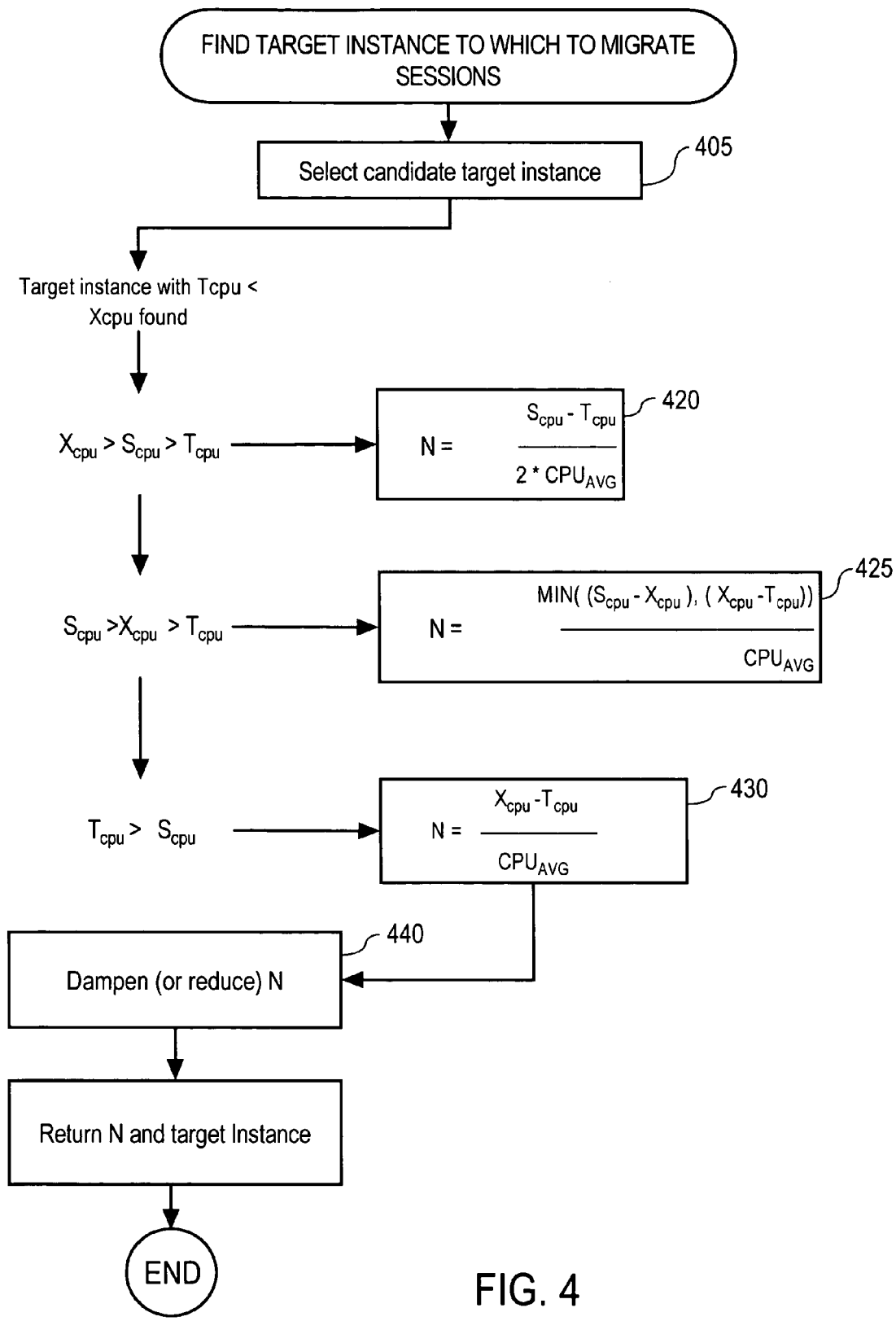
FIG. 4 is a flow chart showing a procedure for finding a server to which to migrate sessions according to an embodiment of the present invention.

To migrate a number of database sessions to a destination instance for a target service, a mechanism is needed to select a destination instance for the target service, and to determine a number of sessions to migrate. Such a mechanism is referred to herein as a find migration destination procedure or function. FIG. 4 shows a find migration destination procedure according to an embodiment of the present invention.

Referring to FIG. 3, at step 305, a candidate service is selected from among candidate services hosted on the source instance. The selection order may be based on the CPU utilization of services, where services with greater CPU utilization are selected before services with less CPU utilization. Alternatively, the selection order may be based on a priority established for the services. The candidate services may include the service experiencing the service-level violation that lead to the resource alert. A reason for including this service is that another node hosting the service may be able to host additional sessions without causing performance service violations.

At step 310, an attempt is made to find a destination instance for the candidate service to which to migrate N sessions. The step is performed by performing the find migration destination procedure depicted in FIG. 4, which determines the value of N. If the find migration destination procedure is unable to find a destination instance, step 305 is repeated again to select another candidate service.

Referring to the find migration destination procedure depicted in FIG. 4, at step 405, an instance from among the database instances hosting the candidate service that has a node CPU utilization less than a threshold is selected (see below). If there is no such instance, no destination instance is selected and the find migration destination procedure ends. Otherwise, the procedure continues on to calculate N number of sessions to migrate.

The calculation is based on the following values:

$T_{cpu}$ Percent CPU utilization of the destination node.

$S_{cpu}$ Percent CPU utilization of the source node.

$X_{cpu}$ A service-level agreement in the form of a threshold CPU utilization for both the source node and destination node.

$CPU_{avg}$ The average percent CPU utilization of a database session for the candidate service on the source instance. The accuracy of $CPU_{avg}$ as an estimate of the CPU utilization of any particular database session to migrate depends on the homogeneity of the CPU utilization by the database sessions of the candidate services on the source instance. If this CPU utilization is homogenous, then the accuracy Of $CPU_{avg}$ is relatively high. Typically, tasks performed within all database sessions of service are roughly similar and therefore CPU utilization should be homogenous.

The information may be generated from performance metrics maintained for the database instances on the destination and source node. For example, the percent CPU utilization on node 124 may be calculated by summing values in column CPU UTILIZATION of performance metrics table 201.

The find migration destination procedure depicted in FIG. 4 begins at step 405. At step 405, a candidate instance of the target service on a different node than the source node is selected. If for a selected candidate instance percent CPU utilization on the respective node is greater than the threshold (i.e. $X_{cpu}$) then another instance is selected. If there is no such instance, then execution of the procedure ends and no destination instance is returned. Otherwise, the procedure continues on to calculate N number of database sessions to migrate.

Three formulas are used to calculate N in three different cases, as follows.

$X_{cpu} > S_{cpu} > T_{cpu}$ In this case, the percent CPU utilization of both the source and destination node are below the threshold. N is calculated such that it represents a number of database sessions to migrate that results in equal CPU utilization on the source node and destination node. The following formula is used to achieve this result (see step 420).

$$N = \frac{S_{cpu} - T_{cpu}}{2 * CPU_{avg}}$$

For purposes of illustration, assume $X_{cpu}$ is 80%, $CPU_{avg}$=2%, $S_{cpu}$=76%, and $T_{cpu}$=64%. The formula results in N=3 i.e. (76−64)/(2*2). The estimate for CPU utilization of the source node after migration is $T_{cpu}-(N*CPU_{avg})$ which is 76−(3*2)=70. The estimate for CPU utilization of the destination node after migration is $T_{cpu}+(N*CPU_{avg})$ which is 64+(3*2)=70. The estimate of CPU utilization on the source and destination node after session migration is equal.

$S_{cpu} > X_{cpu} > T_{cpu}$ In this case, source node CPU utilization is greater than the threshold but the destination node CPU utilization is below the threshold. N is calculated such that it represents a number of database sessions to migrate that results in a reduction of CPU utilization on the source node to the threshold level. If however, the additional load of this number of database sessions would cause (as estimated) the destination node to exceed the threshold, then N is calculated such that it represents a number of database sessions to migrate that results in a elevation of CPU utilization on the destination node to the threshold level. The following formula is used to achieve this result. (see step 425)

$$N = \frac{\text{Minimum}(S_{cpu} - X_{cpu}, X_{cpu} - T_{cpu})}{CPU_{avg}}$$

MINIMUM is a function whose result is the minimum value of the functions two arguments. For purposes of illustration, assume $X_{cpu}$ is 80%, $CPU_{avg}$=2%, $S_{cpu}$=90%, and $T_{cpu}$=74%. The formula results in N=3. The estimate of CPU utilization on the destination node after migration is 80 (i.e. 74+3*2).

The estimate of CPU utilization on the source node after migration is 84, (i.e. 90−3*2), an amount still greater than the threshold. Additional sessions may be migrated from the source node to further reduce CPU utilization on the source node by performing another iteration of the incremental session balancing procedure.

If N had been calculated using the maximum instead of the minimum difference in the above formula, i.e., $S_{cpu}-X_{cpu}$ instead of $X_{cpu}-T_{cpu}$ (the maximum represents the estimate of the number of sessions to migrate to reduce source node CPU utilization to the threshold), then the result for N is 5. Using this value for N, the estimate of CPU utilization on the destination node after migrating 5 sessions to the destination node is 84 (74+5*2), an amount that exceeds the threshold.

$T_{cpu} > S_{cpu}$ In this case, the percent CPU utilization of the destination node is greater than the source node. The following formula is used in this case. (see step 430)

$$N = \frac{X_{cpu} - T_{cpu}}{CPU_{avg}}$$

Preventing Oscillations of Session Balancing

N is calculated to avoid causing the destination node to exceed the threshold. As mentioned previously, $CPU_{avg}$ may not accurately estimate future CPU utilization of a database session migrated to the target. The CPU utilization may in fact be higher. If this is the case, then migration may result in causing the destination node to exceed the threshold. This service-level violation may trigger yet another invocation of incremental session balancing, causing further session migration that can cascade into an oscillation of incremental session balancing, creating a performance burden on the system, leaving service-level violations unresolved and creating new service-level violations to contend with.

To reduce the likelihood of this result, several measures may be undertaken. First, at step 440, the value calculated for N is dampened or reduced, thereby reducing the risk that migrated sessions whose CPU utilization is greater than assumed will cause the destination node to exceed the threshold. N may be dampened by a factor, e.g. 0.5. The amount dampened to reduce this risk depends on the accuracy of $CPU_{avg}$ as an estimate of future CPU utilization of a migrated database session. For example, if the CPU utilization among the database sessions on the source node of the candidate service is homogenous, then the accuracy of $CPU_{avg}$ is higher and the amount dampened can be reduced or even be eliminated. If the CPU utilization among the database sessions on the source node of the candidate service is not homogenous and can vary widely, the amount to dampen should be greater.

Dampening N also accommodates the work load balancing performed by connection time balancing. Connection time balancing directs connections away from the source instance, which is suffering a service-level violation, to other instances, including the destination instance. A dampened value of N avoids shifting to the destination instance an amount a work that, in combination with work shifted there by connection time balancing, causes the destination instance to exceed the threshold.

Finally, another measure to avoid this form of oscillation is to use a lower value of CPU utilization in place of $X_{cpu}$ in the above mentioned formulas.

At step 440, the destination instance and N are returned.

Migrating the Sessions

Once a destination instance and N number of database sessions to migrate has been determined, that number (or a portion thereof) of database sessions is migrated to a destination instance.

Referring to FIG. 3, at step 315, a job process is issued to migrate N sessions to the destination instance. Issuing a migration job creates an asynchronous job that is responsible for migrating the database sessions. Migrating database sessions involves intricate coordination and handshaking between processes and nodes, sometimes incurring significant delay and even a failure that can cause a computer process performing session migration to stop executing. Thus, delegating this task to the asynchronous job insulates the database director from such delays and risk and allows the database director to continue executing and perform its responsibilities.

At step 320, the database director waits for the migration result from the job process. The migration result indicates whether the migration succeeded, how many database sessions were migrated from the source instance to the destination instance, and if the migration was not successful, a reason why. It is also possible the job process may not return a result because it encountered a disabling error.

The database director waits for a time-out period. If the database director does not receive a result within the time-out period, the procedure proceeds to step 330, where the job is aborted, and then to step 305, where the search for a candidate service begins anew.

Otherwise, at step 325, the database director assesses the effects of the session migration by determining whether the service-level violation persists. For example, a service-level violation for service FIN triggered the need to perform incremental session balancing, the service-level violation being that the CPU utilization for service FIN exceeded 60% on node 124. Performance metrics table 201 may be examined by the database director to determine what the percent CPU utilization is for service FIN.

If the service-level violation persists, then the procedure proceeds to step 305, where the search for a candidate service begins anew.

It is possible that the resource alert may persist in spite of performing incremental session balancing and/or that there is no database instance that qualifies as a destination instance under find migration destination processing, and hence there is no destination to which to offload database sessions. In this case, resolution of the resource alert is escalated to another form of remedy, such as adding a node or expanding a service to another database instance. For example, if for all the candidate services no destination instance can be found to migrate sessions using the incremental session balancing, or if the trigger event persists after iterating through the incremental session balancing procedure a number of times, then a service among the candidate services can be expanded to another database instance, or another database instance added for the database and services expanded to the newly added database instance.

Alternate Embodiments

The approach depicted in FIGS. 3 and 4 for determining a target service, destination instance and N number of sessions to migrate is illustrative but not limiting. For example, the destination node and source node can each be associated with different CPU utilization thresholds for the node. The value N can be calculated in a way that accounts for both separate thresholds and for migrating a number of sessions that avoids causing the destination node to exceed its own CPU utilization threshold.

In addition, a policy function can be invoked to return a target service, destination instance and N number of sessions to migrate. Such a policy function could return one or more target services, destination instances, and a number of sessions to migrate for each combination of target service and destination instance. The input to such a policy function could include data about the candidate services on the database instance experiencing the service-level violation, the CPU utilization of each of the services, and other database instances hosting the candidate services and CPU utilization of services on the other database instances. The functions could implement a variety of approaches for determining the target service, destination instance, and N number of sessions to migrate. Further, such a policy function could be user-supplied, that is, could be functions that are not part of the native software of a database server and but are registered with the database server to be invoked for the purpose of determining target services and destination instances and sessions to migrate.

Calculation of N Based on Performance Grades and Deltas

Calculation of N number of sessions to migrate may also be based on performance grades and performance deltas. A performance grade is a value or set of values that indicate the relative work performance for a service offered by a resource, such as a server in a multi-node computer system, relative to other resources. Performance grades are used to dynamically allocate work within a multi-node computer system. A performance delta is a value that indicates the difference in a performance grade caused by allocating more or less work to a computer resource, such as a database server. Performance grades are described in *Calculation of Service Performance Grades in a Multi-Node Environment That Hosts the Services* (50277-2410). According to an embodiment, performance grades and performance grade deltas are generated by a workload monitor that periodically transmits revised versions of the performance grades and deltas to a database director.

In an embodiment, a performance grade is based on a mathematical function that represents the rate at which an additional session is "given" CPU processing time on a node. The performance delta represents the change in a performance grade for a node or server for an additional session on a node. In this embodiment, a higher performance grade is better and the performance grade decreases as more work is added (meaning that the performance grade delta is negative).

Workload can be balanced by determining the N number of sessions needed to migrate and achieve equality between the performance grades of the source node and destination node. N may be calculated by applying the respective performance deltas to the respective performance grades of the nodes to determine the number of sessions needed to make the performance grades equal.

For example, let $g_1$=performance grade on worse performing node $nd_1$;
$g_2$=performance grade on better performing node $nd_2$;
$d_1$=performance grade delta on node $nd_1$; and
$d_2$=performance grade delta on node $nd_2$.

The performance grades of nodes $nd_1$ and $nd_2$ after migrating N sessions from $nd_1$ to $nd_2$ are defined by the following pair of equations.

$g_1-N*d_1$=performance grade of node $nd_1$ after removing N sessions.

$g_2+N*d_2$=performance grade of node $nd_2$ after adding N sessions.

The equations may be solved to find N, as follows.

$$N=(g_1-g_2)/(d_1+d_2)$$

N can be dampened by a dampening factor before sessions are migrated to prevent oscillations. Before a next iteration of the session migration, revised performance grades and performance grade deltas can be reported by the workload monitor. In the next iteration of the migration, the database director uses the revised performance grades and performance grade deltas to compute the new number of sessions to migrate.

In an embodiment, a performance grade may indicate a VIOLATING status and BLOCKED status. The VIOLATING status specifies that the respective node is experiencing a service-level violation. The BLOCKED status specifies the listener is no longer routing connection requests to the node.

The database director avoids migrating sessions to nodes whose performance grades report that the service level for the service in consideration is in VIOLATING and/or BLOCKED status.

Hardware Overview

Figure 5:
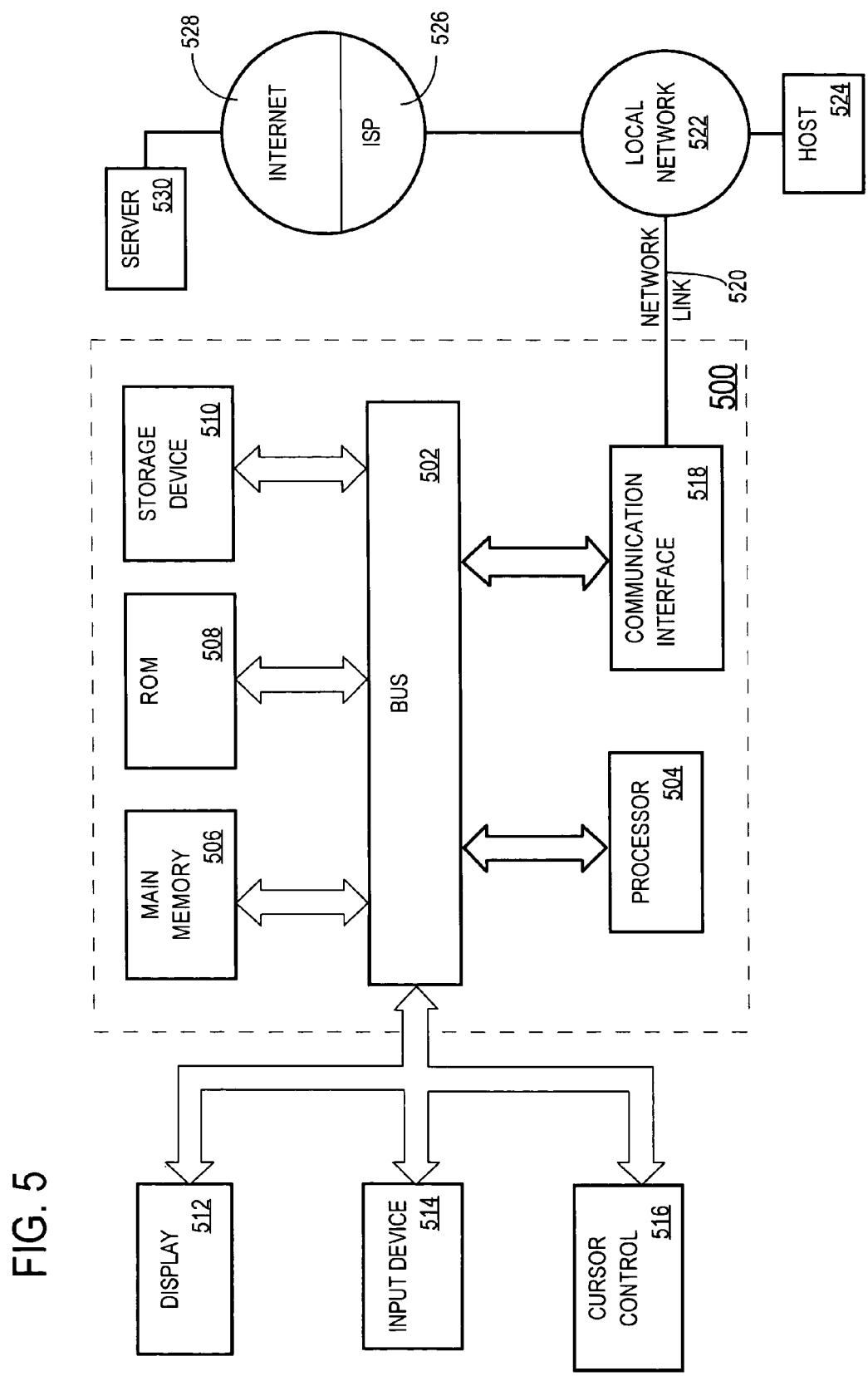
FIG. 5 is a block diagram of a computer system that may be used in an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for balancing use of resources between nodes of a multi-node system, the method comprising the steps of:
   detecting a service-level violation on a first node from a set of nodes in the multi-node system;
   wherein the set of nodes hosts a multi-node server that includes a first server instance on the first node;
   determining a first number of a plurality of sessions running on the first server instance to migrate to a second server instance of the multi-node server on a second node of said set of nodes, wherein the step of determining includes calculating a particular number of sessions estimated to avoid causing a service-level violation on the second node by migrating said particular number of sessions to said second server instance;
   migrating at least a portion of said first number of a plurality of sessions to said second server instance;
   determining whether said service-level violation on the first node persists; and
   if said service-level violation persists, repeating the step of determining a first number of instances and the step of migrating.

2. The method of claim 1, wherein repeating the step of determining further includes dampening the particular number of sessions determined.

3. A computer-readable volatile or non-volatile medium storing one or more sequences of instructions which, when executed by one or more processors, causes the one or more processors to perform the method recited in claim 2.

4. The method of claim 1, wherein the step of determining a first number of a plurality of sessions running on the first server instance to migrate is based on a set of one or more performance measures that includes CPU utilization.

5. A computer-readable volatile or non-volatile medium storing one or more sequences of instructions which, when executed by one or more processors, causes the one or more processors to perform the method recited in claim 4.

6. The method of claim 1, wherein the step of determining a first number of a plurality of sessions is based on:
   S as a percent CPU utilization of the first node,
   T as a percent CPU utilization on the second node, and
   A as an average percent utilization of a set of sessions on the first node.

7. The method of claim 6, wherein the step of determining a first number includes calculating a particular number as N, where $$N = \frac{S-T}{2*A}.$$

8. The method of claim 7, wherein the step of calculating a particular number is performed if a threshold of CPU utilization is greater than S and S is greater than T.

9. A computer-readable volatile or non-volatile medium storing one or more sequences of instructions which, when executed by one or more processors, causes the one or more processors to perform the method recited in claim 8.

10. A computer-readable volatile or non-volatile medium storing one or more sequences of instructions which, when executed by one or more processors, causes the one or more processors to perform the method recited in claim 7.

11. The method of claim 6, wherein:
    X is a threshold of CPU utilization; and
    the step of determining a first number includes calculating a particular number as N,
    wherein $$\text{wherein } N = \frac{\text{Minimum}(S-X, X-T)}{A}.$$

12. The method of claim 11, wherein the step of calculating a particular number is performed if S is greater than X and X is greater than T.

13. A computer-readable volatile or non-volatile medium storing one or more sequences of instructions which, when executed by one or more processors, causes the one or more processors to perform the method recited in claim 12.

14. A computer-readable volatile or non-volatile medium storing one or more sequences of instructions which, when executed by one or more processors, causes the one or more processors to perform the method recited in claim 11.

15. The method of claim 6, wherein:
    X is a threshold of CPU utilization; and
    the step of determining a first number includes calculating a particular number as N,
    wherein $$N = \frac{X-T}{A}.$$

16. The method of claim 15, wherein the step of calculating the first number is performed if T is greater than S and X is greater than T.

17. The method of claim 16, wherein:
    a plurality of services are hosted by one or more server instances of said multi-node server, wherein each service of said plurality of services is work of particular type;
    the steps further include:
        selecting a particular service of said plurality of services;
        selecting a server instance hosting said particular service on a node different than said first node; and
        determining whether one or more sessions can be migrated to said server instance.

18. The method of claim 17, wherein the step of determining whether one or more sessions can be migrated includes said determining a first number.

19. A computer-readable volatile or non-volatile medium storing one or more sequences of instructions which, when executed by one or more processors, causes the one or more processors to perform the method recited in claim 18.

20. A computer-readable volatile or non-volatile medium storing one or more sequences of instructions which, when executed by one or more processors, causes the one or more processors to perform the method recited in claim 15.

21. A computer-readable volatile or non-volatile medium storing one or more sequences of instructions which, when executed by one or more processors, causes the one or more processors to perform the method recited in claim 16.

22. A computer-readable volatile or non-volatile medium storing one or more sequences of instructions which, when executed by one or more processors, causes the one or more processors to perform the method recited in claim 17.

23. A computer-readable volatile or non-volatile medium storing one or more sequences of instructions which, when executed by one or more processors, causes the one or more processors to perform the method recited in claim 6.

24. The method of claim 1, wherein:
the multi-node server is a database server managing access to a database;
said first server instance manages access to said database; and
said second server instance manages access to said database.

25. A computer-readable volatile or non-volatile medium storing one or more sequences of instructions which, when executed by one or more processors, causes the one or more processors to perform the method recited in claim 24.

26. The method of claim 1, wherein:
the set of nodes is a cluster with each node having shared access to a non-volatile storage; and
each node of said cluster accesses a data item stored on said non-volatile storage without requiring another node access said data item on said each node's behalf.

27. A computer-readable volatile or non-volatile medium storing one or more sequences of instructions which, when executed by one or more processors, causes the one or more processors to perform the method recited in claim 26.

28. The method of claim 1, wherein the step of determining a first number of a plurality of sessions is based on:
a plurality of performance grades that each indicate relative performance that can be achieved on said first node and said second node; and
performance deltas, wherein each performance delta is associated with a certain performance grade of said plurality of performance grades and indicates a change to the certain performance grade caused by adding work to the node associated with the performance grade.

29. The method of claim 28, wherein repeating the step of determining further includes dampening the number of sessions determined.

30. A computer-readable volatile or non-volatile medium storing one or more sequences of instructions which, when executed by one or more processors, causes the one or more processors to perform the method recited in claim 29.

31. The method of claim 28, wherein the steps further include:
receiving a first version of performance grades of said plurality of performance grades before performing the step of determining a first number;
after the step of migrating, receiving a second version of said plurality of performance grades as a revised version of said first version of performance grades; and
wherein the step of repeating includes determining a first number based on the second version of performance of performance grades.

32. A computer-readable volatile or non-volatile medium storing one or more sequences of instructions which, when executed by one or more processors, causes the one or more processors to perform the method recited in claim 31.

33. The method of claim 28, wherein each performance grade of said plurality of performance grades includes data indicating at least one status of a set of statuses, the set of statuses including:
a BLOCKED status associated with a node, and
a VIOLATING status associated with a node; and
wherein the step of migrating includes foregoing migrating any sessions based on said at least one status.

34. A computer-readable volatile or non-volatile medium storing one or more sequences of instructions which, when executed by one or more processors, causes the one or more processors to perform the method recited in claim 33.

35. The method of claim 28, wherein
$g_1$ is a performance grade for the first node;
$g_2$ is a performance grade for the second node;
$d_1$ is a performance grade delta for the first node;
$d_2$ is a performance grade delta on the second node; and
the step of determining a first number includes calculating a particular number as N, where $N=(g_1-g_2)/(d_1+d_2)$.

36. A computer-readable volatile or non-volatile medium storing one or more sequences of instructions which, when executed by one or more processors, causes the one or more processors to perform the method recited in claim 35.

37. A computer-readable volatile or non-volatile medium storing one or more sequences of instructions which, when executed by one or more processors, causes the one or more processors to perform the method recited in claim 28.

38. The method of claim 1, wherein the first number of the plurality of sessions is determined to be exactly one.

39. A computer-readable volatile or non-volatile medium storing one or more sequences of instructions which, when executed by one or more processors, causes the one or more processors to perform the method recited in claim 38.

40. The method of claim 1, wherein the first number of the plurality of sessions is determined to be greater than 1.

41. A computer-readable volatile or non-volatile medium storing one or more sequences of instructions which, when executed by one or more processors, causes the one or more processors to perform the method recited in claim 40.

42. A computer-readable volatile or non-volatile medium storing one or more sequences of instructions which, when executed by one or more processors, causes the one or more processors to perform the method recited in claim 1.

43. A method for balancing use of resources between nodes of a multi-node system, the method comprising the steps of:
detecting a service-level violation on a first node from a set of nodes in the multi-node system;
wherein the set of nodes hosts a multi-node server that includes a first server instance on the first node;
determining a first number of a plurality of sessions running on the first server instance to migrate to a second server instance of the multi-node server on a second node of said set of nodes, wherein the step of determining includes calculating a particular number of sessions estimated to reduce work performed by the first node sufficiently to eliminate said service-level violation;
migrating at least a portion of said first number of a plurality of sessions to said second server instance;
determining whether said service-level violation on the first node persists; and
if said service-level violation persists, repeating the step of determining a first number of instances and the step of migrating.

44. A computer-readable volatile or non-volatile medium storing one or more sequences of instructions which, when executed by one or more processors, causes the one or more processors to perform the method recited in claim 43.

45. The method of claim 43, wherein the step of determining further includes dampening the particular number of sessions determined.

46. A computer-readable volatile or non-volatile medium storing one or more sequences of instructions which,when executed by one or more processors, causes the one or more processors to perform the method recited in claim 45.

47. The method of claim 43, wherein the step of determining a first number of a plurality of sessions running on the first server instance to migrate is based on a set of one or more performance measures that includes CPU utilization.

48. A computer-readable volatile or non-volatile medium storing one or more sequences of instructions which, when executed by one or more processors, causes the one or more processors to perform the method recited in claim 47.

49. The method of claim 43, wherein the step of determining a first number of a plurality of sessions is based on:

S as a percent CPU utilization of the first node,

T as a percent CPU utilization on the second node, and

A as an average percent utilization of a set of sessions on the first node.

50. The method of claim 49, wherein the step of determining a first number includes calculating a particular number as N, where $$N = \frac{S-T}{2*A}.$$

51. The method of claim 50, wherein the step of calculating a particular number is performed if a threshold of CPU utilization is greater than S and S is greater than T.

52. A computer-readable volatile or non-volatile medium storing one or more sequences of instructions which, when executed by one or more processors, causes the one or more processors to perform the method recited in claim 51.

53. A computer-readable volatile or non-volatile medium storing one or more sequences of instructions which, when executed by one or more processors, causes the one or more processors to perform the method recited in claim 50.

54. The method of claim 49, wherein:

X is a threshold of CPU utilization; and the step of determining a first number includes calculating a particular number as N, wherein $$\text{wherein } N = \frac{\text{Minimum}(S-X, X-T)}{A}.$$

55. The method of claim 54, wherein the step of calculating a particular number is performed if S is greater than X and X is greater than T.

56. A computer-readable volatile or non-volatile medium storing one or more sequences of instructions which, when executed by one or more processors, causes the one or more processors to perform the method recited in claim 55.

57. A computer-readable volatile or non-volatile medium storing one or more sequences of instructions which, when executed by one or more processors, causes the one or more processors to perform the method recited in claim 54.

58. The method of claim 49, wherein:

X is a threshold of CPU utilization; and the step of determining a first number includes calculating a particular number as N, wherein $$N = \frac{X-T}{A}.$$

59. The method of claim 58, wherein the step of calculating the first number is performed if T is greater than S and X is greater than T.

60. The method of claim 59, wherein:

a plurality of services are hosted by one or more server instances of said multi-node server, wherein each service of said plurality of services is work of particular type;

the steps further include:

selecting a particular service of said plurality of services;

selecting a server instance hosting said particular service on a node different than said first node; and determining whether one or more sessions can be migrated to said server instance.

61. The method of claim 60, wherein the step of determining whether one or more sessions can be migrated includes said determining a first number.

62. A computer-readable volatile or non-volatile medium storing one or more sequences of instructions which, when executed by one or more processors, causes the one or more processors to perform the method recited in claim 61.

63. A computer-readable volatile or non-volatile medium storing one or more sequences of instructions which, when executed by one or more processors, causes the one or more processors to perform the method recited in claim 58.

64. A computer-readable volatile or non-volatile medium storing one or more sequences of instructions which, when executed by one or more processors, causes the one or more processors to perform the method recited in claim 59.

65. A computer-readable volatile or non-volatile medium storing one or more sequences of instructions which, when executed by one or more processors, causes the one or more processors to perform the method recited in claim 60.

66. A computer-readable volatile or non-volatile medium storing one or more sequences of instructions which, when executed by one or more processors, causes the one or more processors to perform the method recited in claim 49.

67. The method of claim 43, wherein:

the multi-node server is a database server managing access to a database;

said first server instance manages access to said database; and said second server instance manages access to said database.

68. A computer-readable volatile or non-volatile medium storing one or more sequences of instructions which, when executed by one or more processors, causes the one or more processors to perform the method recited in claim 67.

69. The method of claim 43, wherein:

the set of nodes is a cluster with each node having shared access to a non-volatile storage; and each node of said cluster accesses a data item stored on said non-volatile storage without requiring another node access said data item on said each node's behalf.

70. A computer-readable volatile or non-volatile medium storing one or more sequences of instructions which, when executed by one or more processors, causes the one or more processors to perform the method recited in claim 69.

71. The method of claim 43, wherein the step of determining a first number of a plurality of sessions is based on:

a plurality of performance grades that each indicate relative performance that can be achieved on said first node and said second node; and performance deltas, wherein each performance delta is associated with a certain performance grade of said plurality of performance grades and indicates a change to the certain performance grade caused by adding work to the node associated with the performance grade.

72. The method of claim 71, wherein repeating the step of determining further includes dampening the number of sessions determined.

73. A computer-readable volatile or non-volatile medium storing one or more sequences of instructions which, when executed by one or more processors, causes the one or more processors to perform the method recited in claim 72.

74. The method of claim 71, wherein the steps further include:
receiving a first version of performance grades of said plurality of performance grades before performing the step of determining a first number;
after the step of migrating, receiving a second version of said plurality of performance grades as a revised version of said first version of performance grades; and
wherein the step of repeating includes determining a first number based on the second version of performance of performance grades.

75. A computer-readable volatile or non-volatile medium storing one or more sequences of instructions which, when executed by one or more processors, causes the one or more processors to perform the method recited in claim 74.

76. The method of claim 71, wherein each performance grade of said plurality of performance grades includes data indicating at least one status of a set of statuses, the set of statuses including:
a BLOCKED status associated with a node, and
a VIOLATING status associated with a node; and
wherein the step of migrating includes foregoing migrating any sessions based on said at least one status.

77. A computer-readable volatile or non-volatile medium storing one or more sequences of instructions which, when executed by one or more processors, causes the one or more processors to perform the method recited in claim 76.

78. The method of claim 71, wherein
$g_1$ is a performance grade for the first node;
$g_2$ is a performance grade for the second node;
$d_1$ is a performance grade delta for the first node;
$d_2$ is a performance grade delta on the second node; and
the step of determining a first number includes calculating a particular number as N, where $N=(g_1-g_2)/(d_1-d_2)$.

79. A computer-readable volatile or non-volatile medium storing one or more sequences of instructions which, when executed by one or more processors, causes the one or more processors to perform the method recited in claim 78.

80. A computer-readable volatile or non-volatile medium storing one or more sequences of instructions which, when executed by one or more processors, causes the one or more processors to perform the method recited in claim 71.

81. The method of claim 43, wherein the first number of the plurality of sessions is determined to be exactly one.

82. A computer-readable volatile or non-volatile medium storing one or more sequences of instructions which, when executed by one or more processors, causes the one or more processors to perform the method recited in claim 81.

83. The method of claim 43, wherein the first number of the plurality of sessions is determined to be greater than 1.

84. A computer-readable volatile or non-volatile medium storing one or more sequences of instructions which, when executed by one or more processors, causes the one or more processors to perform the method recited in claim 83.

* * * * *

UNITED STATES PATENT AND TRADEMARK OFFICE
CERTIFICATE OF CORRECTION

PATENT NO. : 7,552,171 B2
APPLICATION NO. : 10/918055
DATED : June 23, 2009
INVENTOR(S) : Lakshminarayanan Chidambaran et al.

It is certified that error appears in the above-identified patent and that said Letters Patent is hereby corrected as shown below:

In column 7, line 38, delete "_____" and insert -- 10/917,953 --, therefor.

In column 8, line 59, delete "Of" and insert -- of --, therefor.

Signed and Sealed this

Thirty-first Day of August, 2010

David J. Kappos
*Director of the United States Patent and Trademark Office*